US008564638B2

(12) United States Patent
Malik

(10) Patent No.: US 8,564,638 B2
(45) Date of Patent: *Oct. 22, 2013

(54) APPARATUS AND METHOD FOR VIDEO CONFERENCING

(71) Applicant: AT&T Intellectual Property I, LP, Atlanta, GA (US)

(72) Inventor: Dale Malik, Marietta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/626,291

(22) Filed: Sep. 25, 2012

(65) Prior Publication Data

US 2013/0038675 A1 Feb. 14, 2013

Related U.S. Application Data

(63) Continuation of application No. 12/335,075, filed on Dec. 15, 2008, now Pat. No. 8,300,082.

(51) Int. Cl.
*H04N 7/15* (2006.01)

(52) U.S. Cl.
CPC ....................................... *H04N 7/15* (2013.01)
USPC ................... 348/14.08; 348/14.12; 348/14.09

(58) Field of Classification Search
USPC ............ 348/14.01–14.16; 370/352, 260–261; 709/204–205
See application file for complete search history.

(56) References Cited

U.S. PATENT DOCUMENTS

| 2004/0239754 | A1* | 12/2004 | Shachar et al. ............ 348/14.08 |
| 2005/0021620 | A1 | 1/2005 | Simon et al. |
| 2006/0002373 | A1* | 1/2006 | Denny .......................... 370/352 |
| 2008/0043832 | A1 | 2/2008 | Barkley et al. |
| 2008/0192770 | A1 | 8/2008 | Burrows et al. |
| 2008/0209486 | A1 | 8/2008 | Casaos |
| 2008/0250458 | A1 | 10/2008 | Roman |

* cited by examiner

*Primary Examiner* — Melur Ramakrishnaiah
(74) *Attorney, Agent, or Firm* — Guntin & Gust, PLC; Douglas Schnabel

(57) ABSTRACT

A system that incorporates teachings of the present disclosure may include, for example, a server having a controller to determine video conferencing capability of a group of communication devices associated with a user where the group of communication devices comprises a set top box and where the determination of the video conferencing capability is performed in temporal proximity with establishing a voice call over an Internet Protocol Multimedia Subsystem (IMS) network between a mobile communication device and at least one device of the group of communication devices; and establish a video conference for participating devices in response to a request from one device of the mobile communication device and the group of communication devices, where the video conference is established over an Internet Protocol Television (IPTV) network, and where the participating devices comprise the mobile communication device and the set top box. Other embodiments are disclosed.

20 Claims, 6 Drawing Sheets

US 8,564,638 B2

APPARATUS AND METHOD FOR VIDEO CONFERENCING

CROSS-REFERENCE TO RELATED APPLICATIONS

This application is a continuation of U.S. patent application Ser. No. 12/335,075 filed Dec. 15, 2008, which is incorporated herein by reference in its entirety.

FIELD OF THE DISCLOSURE

The present disclosure relates generally to communication systems and more specifically to an apparatus and method for video conferencing.

BACKGROUND OF THE DISCLOSURE

Video conferencing is increasing in popularity as a means for cost savings compared to traveling to meetings, as well as a means for more effective communication compared to telephone conferences. Service providers have various techniques for transmitting video and audio content to users. Users often have various devices with video conferencing and/or presentation capabilities. These devices can have a wide variety of adjustable features for improving the viewing and listening experience of the users.

DETAILED DESCRIPTION OF THE DRAWINGS

Figure 1:
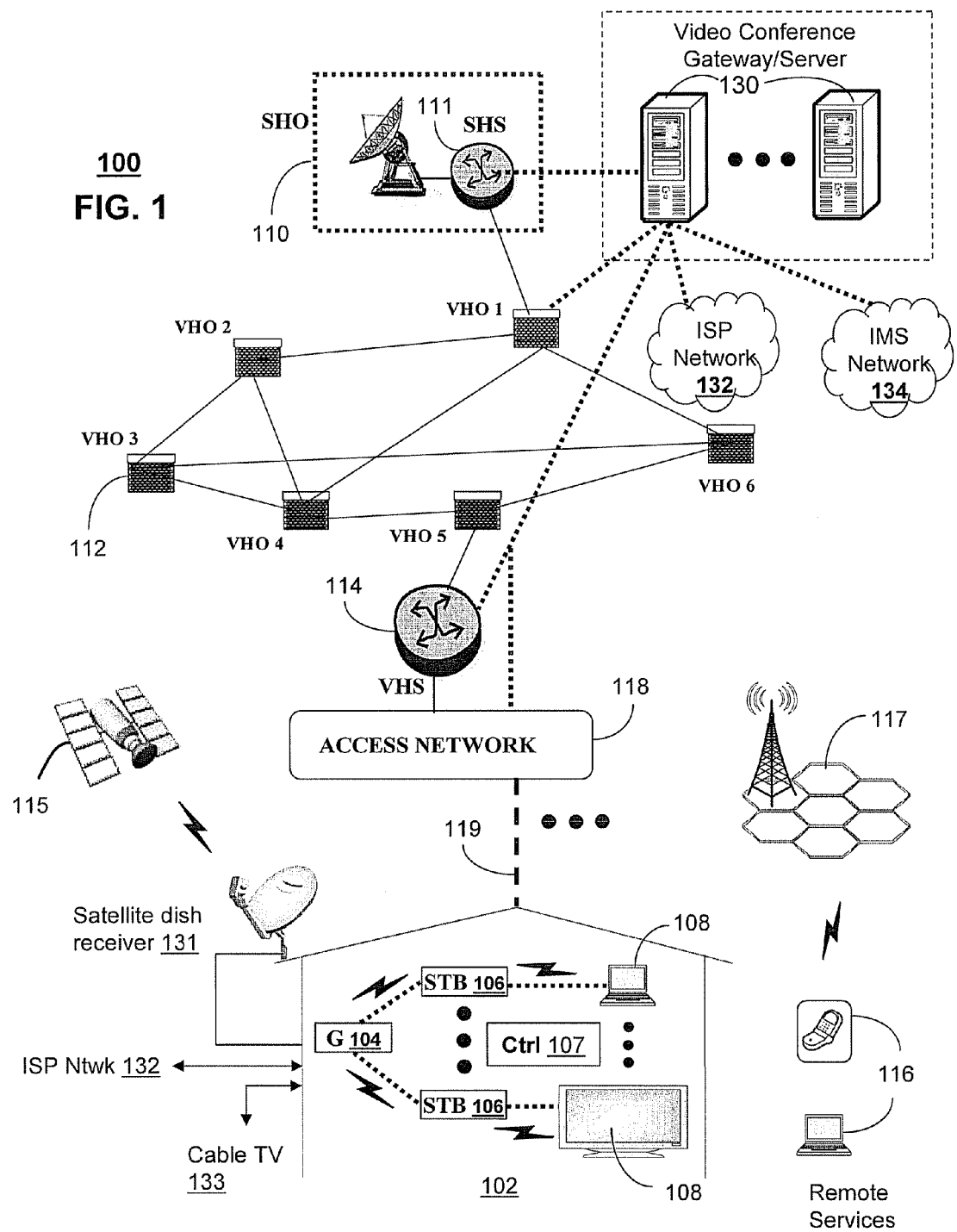
FIGS. 1-2 depict illustrative embodiments of communication systems that provide media services.

One embodiment of the present disclosure can entail computer-readable storage medium comprising computer instructions for engaging in a voice call over an Internet Protocol Multimedia Subsystem (IMS) network between a mobile communication device and at least one device of a group of communication devices associated with a user where the group of communication devices comprises a set top box, determining video conferencing capability of each device of the group of communication devices using a Session Initiation Protocol (SIP) exchange where the determination of video conferencing capability is performed in temporal proximity with the establishing of the voice call, receiving over one of the IMS network and an Internet Protocol Television (IPTV) network a request for video conferencing from one of the mobile communication device and the group of communication devices, adjusting and transmitting the request over the other of the IMS network and the IPTV network to the mobile communication device or each device of the group of communication devices that is determined to have video conferencing capability, establishing a video conference for participating devices in response to the request where the participating devices comprise the mobile communication device and the set top box, and receiving and adjusting a format of video streams of the video conference for transmission between the IMS network and the IPTV network where the video streams comprise video content captured by the mobile communication device and the set top box.

Another embodiment of the present disclosure can entail a server having a controller to determine video conferencing capability of a group of communication devices associated with a user where the group of communication devices comprise a set top box and where the determination of video conferencing capability is performed in temporal proximity with establishing a voice call over an Internet Protocol Multimedia Subsystem (IMS) network between a mobile communication device and at least one device of the group of communication devices, and establish a video conference for participating devices in response to a request from one of the mobile communication device and the group of communication devices where the video conference is established over an Internet Protocol Television (IPTV) network and where the participating devices comprising the mobile communication device and the set top box.

Yet another embodiment of the present disclosure can entail a set top box having a controller adapted to exchange Session Internet Protocol (SIP) data over an Internet Protocol Television (IPTV) network with a server for determination of video conferencing capability of a group of communication devices associated with a user where the group of communication devices comprise the set top box and where the determination of video conferencing capability is performed in temporal proximity with establishing a voice call over an Internet Protocol Multimedia Subsystem (IMS) network between a mobile communication device and at least one device of the group of communication devices, transmit to the server a request for a video conference with the mobile communication device, and capture and transmit video to the server during the video conference over the IPTV network where the video is adapted for reformatting by the server for transmitting over the IMS network to the mobile communication device.

Yet another embodiment of the present disclosure can entail a mobile communication device having a controller to exchange video session data over an Internet Protocol Multimedia Subsystem (IMS) network with a server for determination of video conferencing capability with one or more devices of a group of communication devices associated with a user where the group of communication devices comprise a set top box, capture and transmit video to the server during the video conference over the IMS network where the video is adapted for reformatting by the server for transmitting over an Internet Protocol Television (IPTV) network to the set top box, and receive and contemporaneously present video captured by the set top box and video captured by another device of the group of communication devices.

Yet another embodiment of the present disclosure can entail accessing user information associated with a group of communication devices associated with a user where the user information comprises video capability for each device of the group of communication devices and where the group of communication devices comprise a set top box, determining video conferencing capability of each device of the group of communication devices based on the user information, receiving over one of an Internet Protocol Multimedia Subsystem (IMS) network and an Internet Protocol Television (IPTV) network a request for video conferencing from one device of a mobile communication device and the group of communication devices, adjusting and transmitting the request over the other of the IMS network and the IPTV network to the mobile communication device or each device of the group of communication devices that is determined to have video conferencing capability, and establishing a video conference for participating devices in response to the request, where the participating devices comprise the mobile communication device and the set top box.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

In one embodiment, the computing devices 130 can comprise a media gateway and server that provide for video conferencing between mobile and fixed communication devices over IMS and IPTV networks. The computing devices 130 can provide a user network, such as a home environment, with an intermediary system that provides a proxy service for video conferencing, as well as means for converting media formats so as to be appropriate for the receiving device. In one embodiment, IMS techniques can be utilized to validate the video sharing capabilities of the endpoints and establish connectivity via SIP. For example, SIP can be utilized following the 3GPP standards for addressing and resource management.

The SIP session can utilize an active voice call to initiate the exchange of service capabilities between the endpoints, and registration of the devices with the registrar. The registration and exchange of options can be performed upon connectivity of the voice call or in temporal proximity thereto, in anticipation that a video session might be engaged at any time by any of the communication devices associated with a user, such as a set top box, PC and/or mobile device associated with, or located in, the user's residence. Once both end point devices have been validated for video sharing, an icon can be presented on each device to show that this capability is active and available.

A request to set up the video sharing session can occur from any of the devices while a voice call is in progress, including a user device that is not currently participating in the voice call. Computing devices 130 can provide for a video conference between a mobile device and a group of user devices, including set top boxes, PC's and mobile devices through use of IMS and IPTV networks. In one embodiment, the computing devices 130 can transmit video/audio streams to and from the PC over the Internet without use of the IPTV access network. In one embodiment, real-time transport protocol can be utilized to stream all or some of the video conference data.

It follows from the above illustrations that the present disclosure can apply to any present or future interactive media content services.

Figure 2:
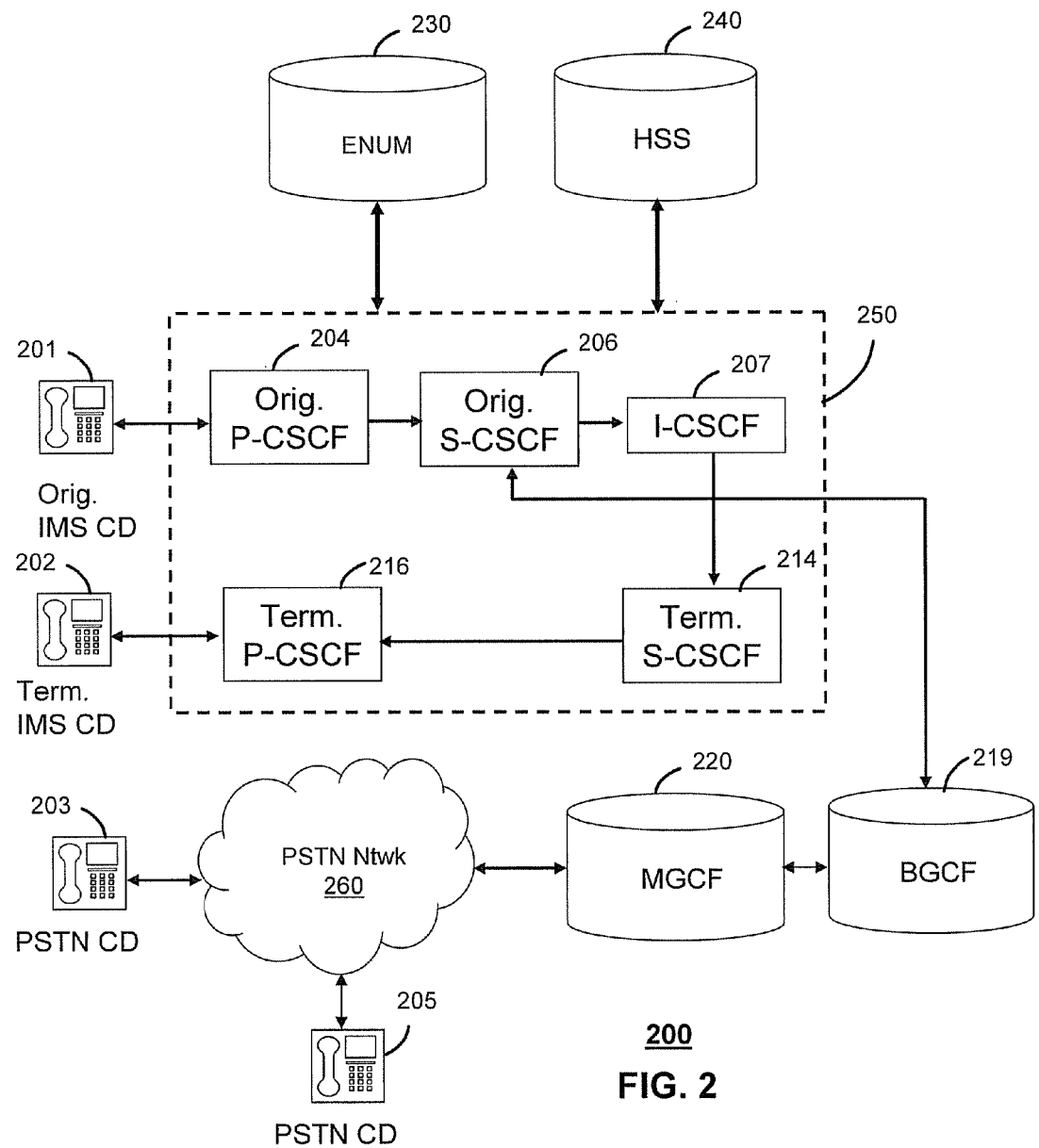

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240.

To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
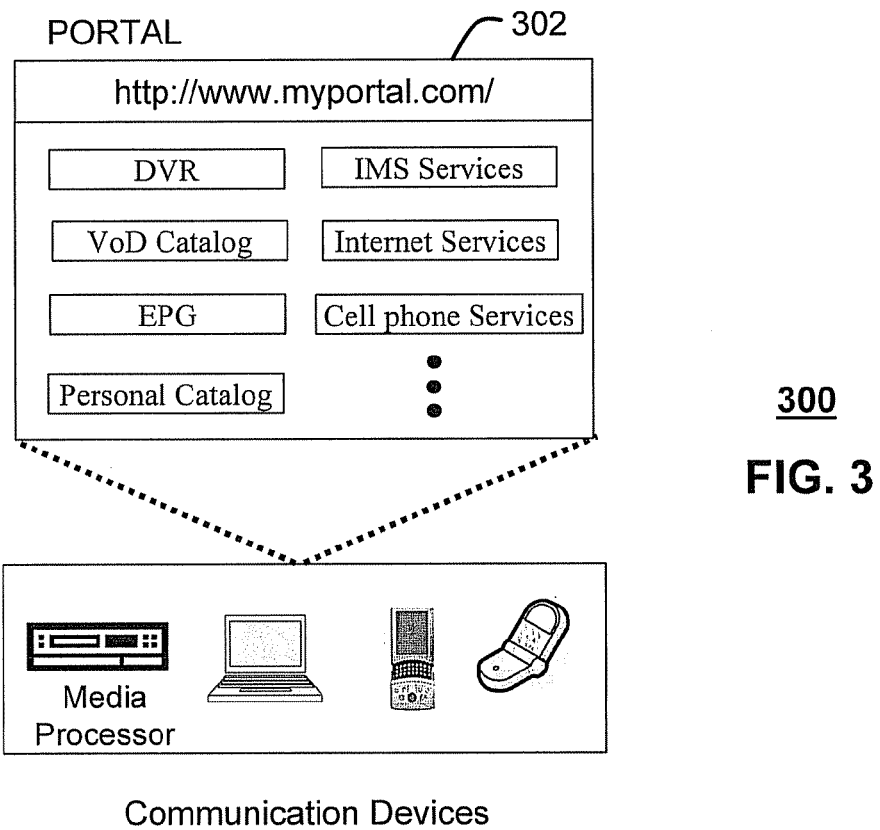
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
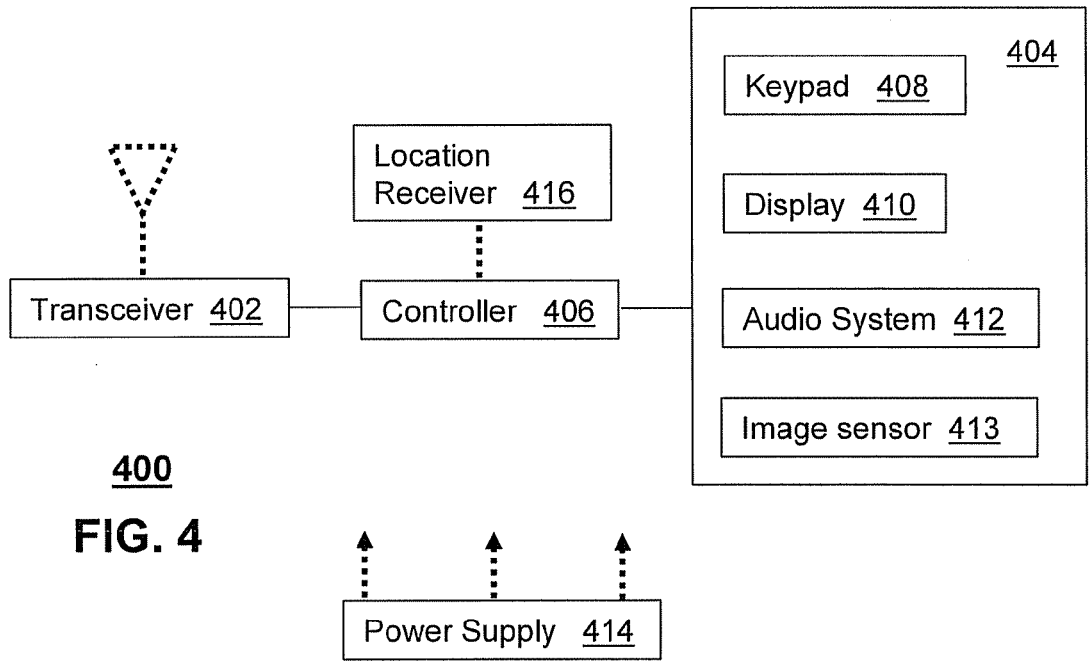
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation. The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
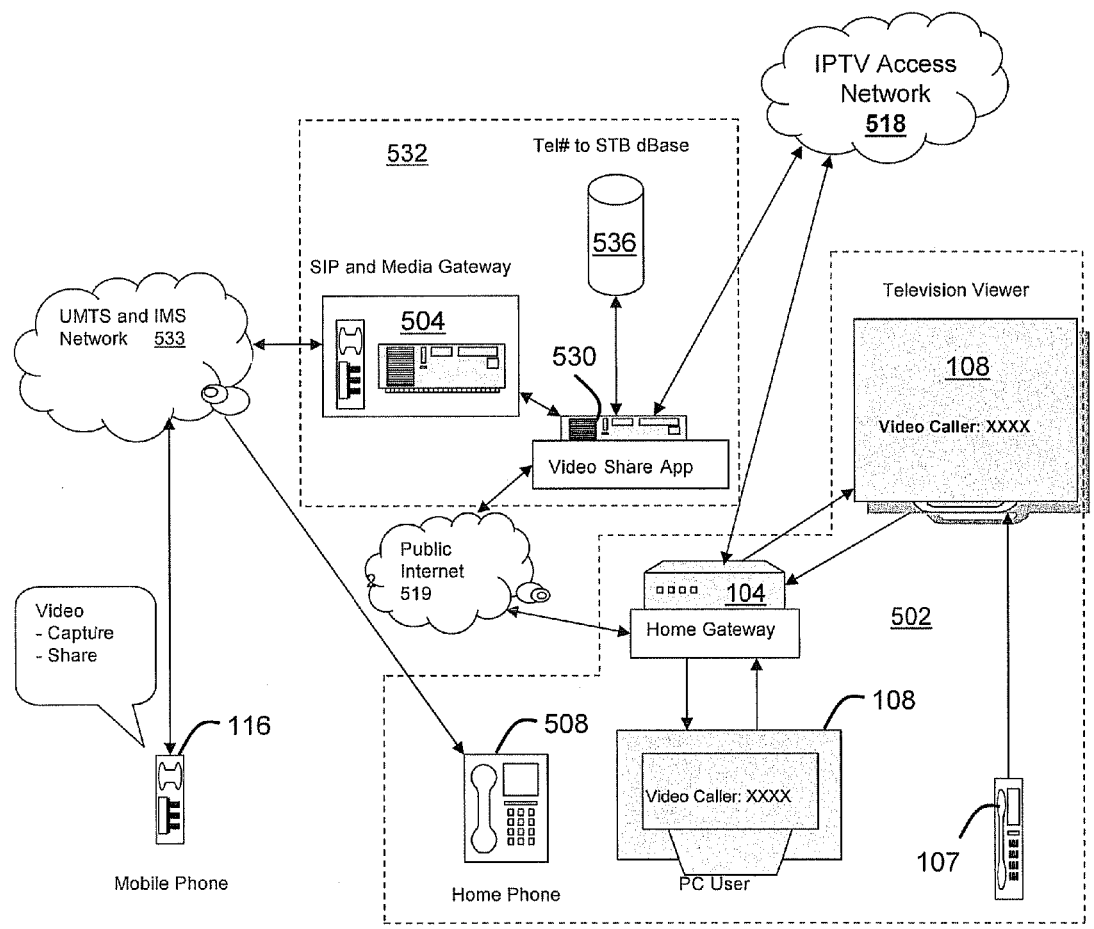
FIG. 5 depicts an illustrative embodiment of a communication system that provides media services.

FIG. 5 depicts an exemplary embodiment of a communication system 500 for delivering media content. Communication system 500 can be overlaid or operably coupled with communication systems 100-300 as another representative embodiment of said communication systems.

System 500 can include a number of different networks, including an IPTV access network 518, the public Internet 519, and IMS network 533 for delivery of media content between parties, including from mobile devices 116 and user fixed devices, such as set top box 104 and PC 108. Other communication devices can participate in the exchange of media content via networks 518, 519 and/or 533, including gateway 104, display device 108, laptop computers, PDA's, handheld devices, and so forth. The particular mode and/or protocol of communication for the various communication devices can vary, and can include wired and/or wireless modes and/or protocols. A number of network devices, including DSLAM's, service routers and Ethernet switches, can be utilized for transporting the signals along and from the various networks 518, 519 and/or 533, and can be provided in various areas of the provider network including intermediate offices, central offices and neighborhood offices, such as office 532. The networks 518, 519 and/or 533 can utilize a number of connection structures for providing a communication link with the communication devices, including twisted pair lines, fiber lines and/or wireless connections. In one embodiment, the IMS network 533 can be coupled to or incorporated with a Universal Mobile Telecommunications System (UMTS) network, which can utilize various components, techniques and protocols for establishing wireless communication with mobile devices, such as W-CDMA.

System 500 can include a media gateway 504 for communication between IMS network 533 and IPTV network 519. The system 500 can include a server 530 which, in combination with the gateway 504, can provide for establishing video conferences between various communication devices, including mobile devices and set top boxes, utilizing the IMS network 533 and the IPTV network 518. In one embodiment, a plurality of devices from a home network, including set top box 104 and PC 108, can capture and participate in a video conference with a mobile device 116. Various screen configurations can be applied for presenting video/audio captured from multiple devices of the user.

The server 530 can have a memory or access thereto, such as a database 536, which can be used for establishing and maintaining user profiles or other user information, including user storage. The user profiles can be associated with one or more users of the IPTV network 518, as well as their communication devices. The user profiles can include device identification data, device and/or user preferences, format capabilities, service plans, presence information, and so forth. In one embodiment, the user storage can include media content, such as video conferences, that have been recorded. In another embodiment, the user profiles can include monitored behavior and history of the user and/or user pre-selections, such as preferences inputted by the user in temporal proximity to a request for a video conference.

In another embodiment, the user information or profiles can be imported in whole or in part from other sources, such as from a third party network, including previous service providers. In one embodiment, the user information or profiles can be a group storage for multiple users, such as users associated with a residence or a business entity, which has a plurality of individual user profiles associated with each of the users. While system 500 depicts the server 530 storing the user information or profiles in a centralized fashion, it should be understood by one of ordinary skill in the art that the present disclosure contemplates other configurations, including distributed configurations, being applied to system 500.

In one embodiment, the server 530 can provide for signal processing to be applied to the video content, such as according to an Advanced Television Systems Committee standard (ATSC) including the mobile handheld standard, so that code is embedded in the multiplex which develops lower profile versions of the main profile. In another embodiment, the standard can be based on or related to the ATSC Recommended Practice: E-VSB Implementation Guidelines, document ATSC A/112, which is the ATSC standards related to E-VSB (Enhanced Vestigial Sideband modulation), and which provides guidelines to parameter selection and implementation scenarios; the disclosure of which is incorporated herein by reference. The E-VSB data can be received by the server 530 and/or generated by the server.

For example, the server can receive video data, such as from one or more communication devices participating in the video conference, and then can reformat the data using E-VSB or other multi-profiling formats with main and lower profile versions. The lower profile versions of the video stream can have a lower resolution but higher error correction data (such as Forward Error Correction data) in order to maintain a link with devices receiving a weak signal. In one embodiment, select one(s) of the profile versions can be provided to the communication device by the server 530 when there is a fault or potential fault determined during the video conference. The fault monitoring can be performed by the server 530 or some other monitoring device, and/or can be performed by the receiving communication device, such as mobile device 116. The particular error correction technique utilized for the various profiles can vary and can include FEC, such as block coding, convolution coding, concatenate coding, turbo coding and so forth.

The exemplary embodiments can be performed by a single service provider or vendor, as well as through use of different service providers or vendors, including home and mobile services being different vendors where the service provider associated with the server 530 provides an agreed service coordination of benefit to the user.

In one embodiment, the server 530 can alert and direct an incoming video stream request to more than one endpoint within the user location, such as the home. The server 530 can also convert the corresponding video stream to the needed or desired format on the receiving device. In another embodiment, the server 530 can be the arbiter for storing and forwarding of the video stream, should none of the endpoints be capable of answering.

The gateway 504 can be a SIP user agent present on an IP network which is capable of acting as a proxy to answer and interpret messages on the user or applications behalf. The gateway 504 can be a fully capable SIP agent that can be accessed by various applications to perform UA proxy capability, including registration and invite.

Figure 6:
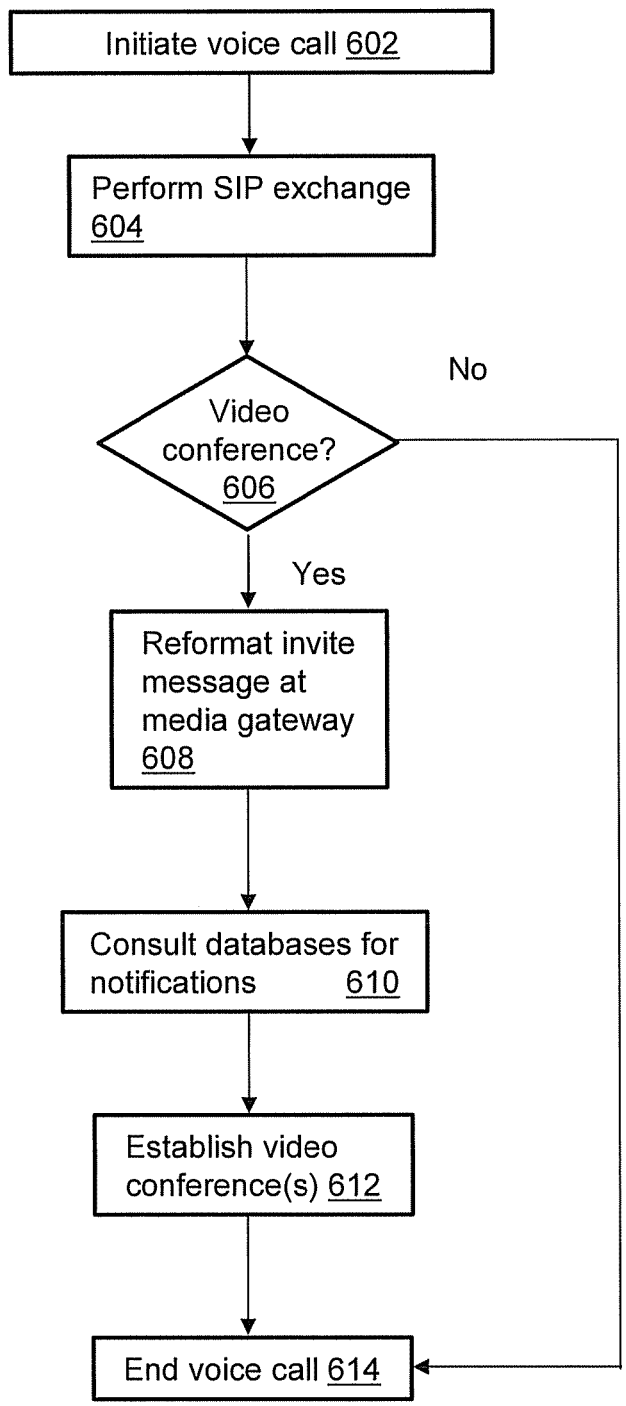
FIG. 6 depicts an illustrative embodiment of a method operating in portions of the communication systems of FIGS. 1-2 and 5.

FIG. 6 depicts an illustrative method 600 operating in portions of communication systems 100-300 and 500, including using gateway 504 and server 530 of system 500. Method 700 can begin with step 602 in which a voice call is placed to a telephone number that is within the numbering plan of the wireless carrier. For instance, the telephone number can be forwarded to the home phone of a user, which as will be described below will enable video sharing within the home. When the home phone answers, a voice call is now operative from the mobile phone's perspective, and it can then attempt to validate video sharing capability with the called party number.

In step 604, an SIP exchange between the calling and called parties can occur through use of a virtual mobile phone being represented by the SIP-media Gateway 504. Registration of the gateway 504 as a proxy for the forwarded mobile phone number can have already occurred and can be currently registered as active with an IMS network 533. In one embodiment, it can be the calling party's responsibility (who began the voice call), to start the initiation of a capabilities exchange to verify video share compatibility. The present example describes the mobile phone 116 being the calling party, but any of the communication devices described herein can be the calling party.

Once the exchange of options has completed, either party can initiate a video share session as in step 606. For example, a mobile user can select the video option from a menu and then select share to initiate video transmission to the mobile identity using a URI obtained during the options exchange or a mobile subscriber ISDN number. An invite message can be routed through the IMS network 533 to the gateway 504, where the message can be deconstructed and then a corresponding request generated and forwarded to a video share application running in the IPTV network 532 in step 608. This application can look up the associated home phone number that was registered against the mobile phone number to determine which subscriber should be alerted, as well as what devices can be alerted in step 610.

For example, the video share application can take the home telephone number and query the STB database to determine which set top box should receive an alert that a mobile video call is being requested. Presence information can be accessed to determine alerts that are to be notified. For instance, if a PC user is registered as being online with the video share application by having logged into a special web page, then its session can be identified as well for alerting. Other communication devices can also be alerted for participation in the video conference based on the presence information and/or user preferences.

In one embodiment, a user profile can be maintained by the server 530 that identifies criteria for alerting the user's communication devices. For instance, the alerts can be transmitted to particular communication devices of a user based on the time of day. These alerts can also be provided based in part on detected presence for the particular communication devices.

With the address of the STB and the possible web session address of the PC, the application can then proceed to alert each of these devices, as well as other devices capable of participating in the video conference call to see if someone wishes to receive and transmit the video stream. For instance, on the home TV an alert can be displayed indicating the calling party and their desire to send a live video stream. In one embodiment, the user can be instructed to go to the iTV applications area to accept the video and begin viewing and transmitting.

In one embodiment, the video share application can be presented in the iTV menu along with other RDP applications that are available. Upon selecting the application from the menu, it can display the video callers information and an accept button to begin the video conference transmission. Using the select button on the remote, the user can activate the video session, and a response can be transmitted back to the SIP media gateway 504 to complete the invite sequence and establish a media connection. Once the mobile phone receives an OK response back from the SIP media gateway 504, it can begin a video session with the answering device(s), including via proxy through the gateway as in step 612 until the session is cancelled by the mobile user or recipient in step 614.

In one embodiment, the media session transmissions in a first direction can be formatted initially in H263 format at 64 kbps as it is routed to the SIP media gateway 504. The gateway 504 can pass this encoded data to the video share application where it can be reformatted into various device compatible formats, including Windows Media 9 content and then routed to the corresponding answering device(s).

In one embodiment, a PC associated with the user that is participating in the video conference can immediately accept the request and begin a Windows Media session with the video share application of server 530 over the Internet rather than through the IPTV framework. In one embodiment, once the voice call is ended, then the video conference will also be ended.

In one embodiment, where multiple communication devices are participating as receiving devices in the video conference, the calling device(s) can presented split screens, quadrants or other GUI's so that each streaming video from each device is being presented. In one embodiment, a portion of the devices can be transmitting video while another portion of the devices are only presenting the video stream. For instance, a video conference can be established by a mobile communication device with a set top box and a PC, where the mobile device and the set top box capture and transmit the video and audio while the PC merely presents the received video conference. In another embodiment, the PC can present the video/audio stream received from the mobile communication device, as well as the video/audio stream that is being transmitted by the set top box, such as in a split screen view or different windows.

In one embodiment, the user profiles can include monitored behavior data associated with the user and one or more of the user's communication devices. The behavior data can be utilized in determining which communication devices should receive video conference alerts. In another embodiment, the server 530 can consult user preferences of the user profiles to determine if the video/audio data is in a desired format or is otherwise comprised of desired parameters associated with the users' communication devices, including the television and PC 108, and/or the mobile communication device 108. For instance, the video data can be adjusted as to resolution by the server 530 prior to receipt by the communication devices. The preferred format can be determined from the user profiles associated with the calling and/or called parties, monitored behavior of the devices or other communication devices associated with the user, and/or inputted preferences, such as preferences provided by the user at the time of generating the recording request. In one embodiment, parties that are not associated with a particular service provider but that participate in a video conference can have sub-profiles established within the user profile so that future video conferences with such parties can be enhanced, such as through video/audio data format adjustments.

In one embodiment, the format adjustment can be based on the use of multiple profile versions of the video content, such as through use of E-VSB. For example, the server 530 can receive the video streams and adjust either or both of the video streams into main and secondary profiles. In another embodiment, the server 530 can receive the video stream containing main and secondary profiles, remove select profile versions, and transmit those select profile versions for the video conference. The multiple versions can be transmitted in one or both directions. The amount of error correction and thus the resolution of the profile versions can be determined based on a number of factors, including user preferences in the user profiles and monitored network conditions, such as traffic or latency. In one embodiment, the video conference can be stored on the server 530 for later playback by one or more of the devices participating in the video conference, as well as other devices.

Upon reviewing the aforementioned embodiments, it would be evident to an artisan with ordinary skill in the art that said embodiments can be modified, reduced, or enhanced without departing from the scope and spirit of the claims described below. For example, the server 530 can allow for participation by other communication devices associated with the user after the video conference has already commenced.

Server 530 can also provide for dynamic application of adjustments to the video/audio data format. For instance, an increase in resolution for the mobile device 116 may not be practical during a period of heavy traffic or weak signal strength. The server 530 can determine the practicality of such an adjustment and then implement the adjustment if practical.

Other suitable modifications can be applied to the present disclosure without departing from the scope of the claims below. Accordingly, the reader is directed to the claims section for a fuller understanding of the breadth and scope of the present disclosure.

Figure 7:
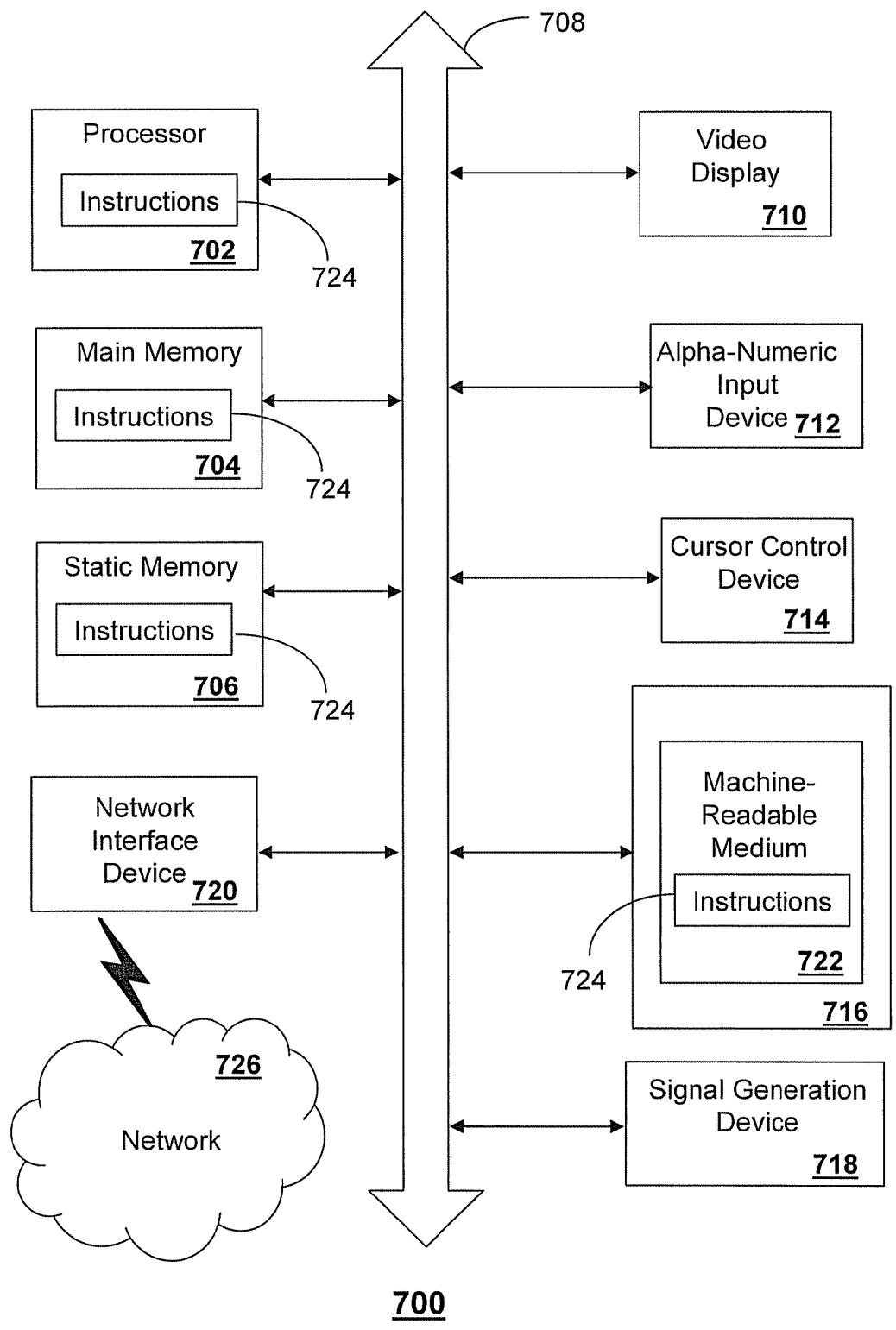
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium comprising instructions which, responsive to being executed by a processor, cause the processor to perform operations comprising:
    initiating a voice call over an internet protocol multimedia subsystem network between a mobile communication device and a device of a group of communication devices associated with a user;
    determining a presence of the user at a set top box of the group of communication devices;
    transmitting a request to the set top box responsive to determining the presence of the user;
    receiving an acceptance of the request from the set top box;
    initiating a video conference between the mobile communication device and the set top box; and
    receiving and adjusting a format of a video stream of the video conference for transmission between the internet protocol multimedia subsystem network and an internet protocol television network, wherein the video stream comprises one of first video content captured by the mobile communication device or second video content captured by the set top box.

2. The non-transitory storage medium of claim 1, wherein presence of the user at a set top box of the group of communication devices is determined by one of querying a set top box database, detecting that the user is on-line, or a combination thereof.

3. The non-transitory storage medium of claim 1, wherein the video conference further comprises a personal computer of the group of communication devices participating in the video conference, the personal computer capturing third video content for the video conference.

4. The non-transitory storage medium of claim 3, wherein the processor further performs operations comprising receiving at the mobile communication device the third video content captured by the personal computer without utilizing the internet protocol television network.

5. The non-transitory storage medium of claim 1, wherein the processor further performs operations comprising:
    accessing user information associated with the group of communication devices, wherein the user information comprises one of video capability or desired data format for each device of the group of communication devices; and
    determining a video conferencing capability based on the user information.

6. The non-transitory storage medium of claim 5, wherein the processor further performs operations comprising adjusting the request based on the user information.

7. The non-transitory storage medium of claim 1, wherein the processor further performs operations comprising adjusting the format of the video stream into a plurality of video stream versions for one of the first video content or the second video content, wherein a first video stream version of the plurality of video stream versions has more error correction data than a second video stream version of the plurality of video stream versions.

8. A server comprising:
    a memory to store computer instructions; and
    a processor coupled to the memory, wherein the computer instructions, responsive to being executed by the processor, cause the processor to perform operations comprising:
        initiating a voice call over an internet protocol multimedia subsystem network between a mobile communication device and a device of a group of communication devices;
        selecting a set-top box from the group of communication devices according to a telephone number associated with the set top box;
        transmitting a request for a video conference to the set-top box responsive to the selection;
        receiving an acceptance of the request from the set-top box; and
        initiating a video conference for participating devices, wherein the video conference is established over an internet protocol television network and wherein the participating devices comprise the mobile communication device and the set top box.

9. The server of claim 8, wherein the processor further performs operations comprising receiving and adjusting a format of a video stream of the video conference for transmission between the internet protocol television network and the internet protocol multimedia subsystem network, and wherein the video stream comprises one of first video content captured by the mobile communication device or second video content captured by the set top box.

10. The server of claim 8, wherein the processor further performs operations comprising adjusting a format of a video stream directed to the mobile communication device into a plurality of video stream versions of video content, wherein a first video stream version of the plurality of video stream versions has more error correction data than a second video stream version of the plurality of video stream versions.

11. The server of claim 8, wherein the processor further performs operations comprising accessing a profile of a user associated with the mobile communication device to determine the telephone number associated with the set top box.

12. The server of claim 8, wherein the participating devices further comprise a personal computer of the group of communication devices and wherein the personal computer transmits third video content captured by the personal computer over an internet protocol network to the mobile communication device without utilizing the internet protocol television network.

13. The server of claim 12, wherein the processor further performs operations comprising transmitting the third video content to the mobile communication device.

14. The server of claim 8, wherein the processor further performs operations comprising:
   storing user information associated with the group of communication devices, the user information comprising video capability information for each device of the group of communication devices;
   determining a video conferencing capability based on the user information; and
   adjusting a format of a video stream of the video conference according to the video conferencing capability.

15. A method comprising:
   establishing, by a system comprising a processor, a voice call over an internet protocol multimedia subsystem network between a mobile communication device and a device of a group of communication devices;
   selecting, by the system, a set-top box from the group of communication devices to join a video conference;
   initiating, by the system, a video conference for participating devices, wherein the video conference is established over an internet protocol television network and the internet protocol multimedia subsystem network and wherein the participating devices comprise the mobile communication device and the set top box; and
   receiving and adjusting, by the system, a format of one of first video content captured by the mobile communication device or second video content captured by the set top box, wherein the format is adjusted according to network traffic conditions for one of the internet protocol television network, the internet protocol multimedia subsystem network, or a combination thereof.

16. The method of claim 15, wherein the video conference further comprises a personal computer of the group of communication devices participating in the video conference, the personal computer capturing third video content for the video conference.

17. The method of claim 16, comprising transmitting, by the system, the third video content captured by the personal computer.

18. The method of claim 15, comprising:
   accessing, by the system, user information associated with the group of communication devices, wherein the user information comprises one of video capability or desired data format for the device of the group of communication devices; and
   determining, by the system, a video conferencing capability based on the user information, wherein the format is adjusted based on the video conferencing capability.

19. The method of claim 15, comprising determining, by the system, a presence of a user at the set top box, wherein the set top box is selected responsive to determining the presence of the user at the set top box.

20. The method of claim 15, comprising determining, by the system, a telephone number associated with a user of the set top box, wherein the set top box is selected according to the telephone number.

* * * * *